United States Patent [19]

Lever et al.

[11] 3,806,591
[45] Apr. 23, 1974

[54] PREPARATION OF GROUP VIII METAL COMPOUNDS

[75] Inventors: Frank Mercer Lever; John James MacGregor; Walter Westwood, all of London, England

[73] Assignee: Johnson, Matthey & Co., Limited, London, England

[22] Filed: June 19, 1972

[21] Appl. No.: 264,241

[30] Foreign Application Priority Data
June 24, 1971 Great Britain.................... 29644/71

[52] U.S. Cl................................. 423/592, 423/632
[51] Int. Cl............................................. C01g 53/04
[58] Field of Search.................................... 423/592

[56] References Cited
UNITED STATES PATENTS

| | | | |
|---|---|---|---|
| 2,377,832 | 6/1945 | Wallis et al. | 423/592 X |
| 3,436,267 | 4/1969 | Faber | 423/592 X |
| 2,602,070 | 7/1952 | Kirkpatrick | 423/592 X |
| 1,937,689 | 12/1933 | Fazer | 423/592 X |

FOREIGN PATENTS OR APPLICATIONS 375,379 10/1939 Italy..................................... 423/592

OTHER PUBLICATIONS

Mellor, "A Comprehensive Treatise On Inorganic & Theoretical Chemistry," Vol. 15, Longmans, Green & Co., N.Y., 1936, pp. 398–400.

Primary Examiner—Herbert T. Carter
Attorney, Agent, or Firm—Cushman, Darby & Cushman

[57] ABSTRACT

This invention describes a method of preparing a hydroxide of a Group VIII metal and in particular a method for preparing hydrated nickel sesquioxide. Basically the invention comprises treating a solution of a compound of the metal in a low valency state with a peroxydisulphate and thereafter adjusting the pH of the solution so as to effect the precipitation of a hydroxide of the Group VIII metal in the higher valency state.

2 Claims, No Drawings

PREPARATION OF GROUP VIII METAL COMPOUNDS

This invention is concerned with improvements in and relating to the preparation of Group VIII metal compounds, especially hydroxides. In particular the invention provides a convenient method for the preparation of a hydrated nickel sesquioxide.

In this specification the word "hydroxide", when used in relation to Group VIII metals, is intended to include within its scope hydrated metal oxides.

The above compound is believed to have the composition $Ni_2O_3.xH_2O$ and, for convenience, will be referred to throughout the remainder of this specification as "nickelic hydroxide".

Known methods of preparing nickelic hydroxide involve forming an aqueous suspension of particles of nickelous hydroxide [$NiO.xH_2O$] and then oxidising these particles by means of the nascent oxygen liberated during electrolysis or by treating the suspension with a solution of sodium hypochlorite or chlorine.

Both of the foregoing methods have the distinct disadvantage of producing a gelatinous mass of nickelic hydroxide which is exceedingly difficult to filter and to wash free from contaminants. In the case of the process involving the use of sodium hypochlorite or chlorine, the product is contaminated with chlorine ions and for some industrial uses of nickelic hydroxide the presence of chloride ions is quite unacceptable.

It is an object of the present invention to provide a method of preparing nickelic hydroxide which does not suffer from the foregoing disadvantages.

According to one aspect of this invention a method of preparing a hydroxide of a Group VIII metal in a higher valency state comprises treating a solution of a compound of the metal in a lower valency state with a peroxydisulphate and thereafter adjusting the pH of the solution so as to effect the precipitation of a hydroxide of the Group VIII metal in the higher valency state.

The cation of the peroxydisulphate and the anion of the compound of the Group VIII metal in the lower valency state are preferably selected to avoid precipitation of a compound formed by the combination thereof.

According to another aspect of this invention, a method of preparing one or more of the hydroxides of a Group VIII metal comprises the steps of treating a solution of a compound of the metal with the peroxydisulphate of an alkali metal and thereafter adding a hydroxide of an alkali metal so as to precipitate the hydroxide of the Group VIII metal.

The Group VIII metal is preferably nickel.

According to yet another aspect of this invention, a method of preparing a nickelic hydroxide comprises treating a solution of a nickelous compound with a peroxydisulphate and thereafter raising the pH of the solution. The pH may be raised, for example, by the addition of an alkali metal hydroxide so as to precipitate the nickel hydroxide.

Any water-soluble nickelous compound may be used.

The nickelous compound is preferably nickel sulphate. Conveniently, to an aqueous solution of this, containing 50–75 g/litre of nickel sulphate at a pH of 4 to 6 at a temperature of 70 to 90°C. there is added a slight excess (typically 5 percent) of the quantity of sodium peroxydisulphate $Na_2S_2O_8$ required to oxidise the nickel to nickel III.

An aqueous solution of sodium hydroxide sufficient to provide three hydroxyl groups for each nickel atom, is run into the solution produced above, the liquid being continuously stirred to prevent the formation of local concentration of sodium hydroxide. An excess of sodium hydroxide must not be added since this would result in some decomposition of the nickelic hydroxide. A non-gelatinous and readily filterable precipitate of nickelic hydroxide is produced.

An embodiment of the invention will now be described by way of example.

60 gm of nickel in the form of nickel sulphate was dissolved in 1 litre of distilled water and the solution was heated and its pH adjusted to 4 to 6 by the addition of sodium hydroxide. To the stirred solution was added 127 gm of sodium peroxydisulphate. This amounted to 5 percent more than the quantity of sodium peroxydisulphate required to oxidise the nickel. After 3 minutes, 1,220 ml of a 5 percent sodium hydroxide solution was added as a steady stream over a period of 2 minutes; stirring was continued for a further 3 minutes and a black precipitate of nickelic hydroxide filtered off and washed with cold water.

By means of the method just described, it is possible to convert at least 90 percent of the nickel sulphate to nickelic hydroxide.

One industrial use of nickelic hydroxide is in the selective removal of cobalt from liquors containing both nickel and cobalt salts in solution.

In this particular application, the nickelic hydroxide is stirred into the liquor to be treated at a suitable value of pH whereupon the nickel is reduced to the divalent state and at least some of the cobalt in solution is oxidised to the trivalent state. The hydrated oxide of trivalent cobalt is insoluble and is accordingly precipitated.

The nickelic hydroxide produced by the method of our invention is relatively finely divided and eminently suitable for the process just described. Typically the liquor to be treated is maintained at about 80°C and the pH of the liquid is then adjusted. The pH of the liquid is adjusted by the addition of a slurry of nickel carbonate to about 5.3. A slurry of nickelic hydroxide would then be added to the stirred solution and, if necessary, the pH maintained by further additions of nickel carbonate slurry. The solution would be maintained at 80°C and at a pH of 5.3 until the reaction was complete.

In carrying out the process just described it is necessary to know in advance the quantity of cobalt present and also the quantity of any other oxidisable metals, such as iron and manganese. This information is required because it is necessary that the quantity of nickelic hydroxide added shall be at least three times the equivalent of the total content of cobalt, and in addition at least the equivalent of the total content of other metals such as iron and manganese which will be oxidised to a higher valency by the nickelic hydroxide.

Although the invention has been described with reference to the preparation of nickelic hydroxide it is also applicable to the formation of the higher hydroxides of the other group VIII metals.

Precipitates of hydroxides of all of the other Group VIII metals have been obtained by methods analagous to that described herein, and these were found to be coloured as follows:

| | | | |
|---|---|---|---|
| Fe | Red | Pd | Dark brown |
| Co | Black | Os | Black |
| Ru | Black | Ir | Black |
| Rh | Green | Pt | Dark brown |

The invention also includes any compound when produced by the methods of the invention.

What we claim is:

1. A method for the production of filterable, finely divided, halogen-free nickelic hydroxide from nickel (II) sulphate consisting essentially of:
   a. dissolving nickel (II) sulphate in water;
   b. adjusting the pH of the solution to lie within the range 4–6 by the addition of dilute sodium hydroxide solution;
   c. heating the solution;
   d. adding a slight stoichiometric excess of sodium peroxydisulphate in aqueous solution;
   e. allowing the resulting mixture to stand;
   f. adding, with stirring, a further quantity of aqueous sodium hydroxide solution sufficient to provide three hydroxyl groups for each nickel atom;
   g. allowing the resulting mixture to stand with further stirring, and thereafter,
   h. filtering and washing with cold water.

2. A method for the production of filterable, finely divided, halogen-free nickelic hydroxide from nickel (II) sulphate in a yield of at least 90 percent consisting essentially of:
   a. dissolving nickel (II) sulphate in water;
   b. adjusting the pH of the solution to lie within the range 4–6 by the addition of dilute sodium hydroxide solution;
   c. increasing the temperature to lie within the range 70–90°C;
   d. adding a slight stoichiometric excess of sodium peroxydisulphate in aqueous solution;
   e. allowing the mixture to stand;
   f. adding, with stirring, a further quantity of aqueous sodium hydroxide solution sufficient to provide three hydroxyl groups for each nickel atom;
   g. allowing the resulting mixture to stand with further stirring;
   h. filtering and washing with cold water.

* * * * *